United States Patent
Guo et al.

(10) Patent No.: US 8,645,630 B2
(45) Date of Patent: Feb. 4, 2014

(54) STREAM CONTEXT CACHE SYSTEM

(75) Inventors: Xiu-Li Guo, Beijing (CN); Jiin Lai, Taipei (TW); Zhi-Qiang Hui, Beijing (CN); Shuang-Shuang Qin, Beijing (CN)

(73) Assignee: VIA Technologies, Inc., Taipei (TW)

( * ) Notice: Subject to any disclaimer, the term of this patent is extended or adjusted under 35 U.S.C. 154(b) by 339 days.

(21) Appl. No.: 12/829,345

(22) Filed: Jul. 1, 2010

(65) Prior Publication Data
US 2011/0066795 A1    Mar. 17, 2011

Related U.S. Application Data

(60) Provisional application No. 61/242,400, filed on Sep. 15, 2009.

(51) Int. Cl.
*G06F 12/00* (2006.01)
(52) U.S. Cl.
USPC .................. 711/137; 711/125; 711/E12.019
(58) Field of Classification Search
None
See application file for complete search history.

(56) References Cited

U.S. PATENT DOCUMENTS

| | | | | |
|---|---|---|---|---|
| 5,359,722 A | * | 10/1994 | Chan et al. | 713/600 |
| 5,509,135 A | * | 4/1996 | Steely, Jr. | 711/147 |
| 2004/0148457 A1 | * | 7/2004 | Hakushi et al. | 711/103 |
| 2004/0186946 A1 | * | 9/2004 | Lee | 711/103 |
| 2005/0132117 A1 | * | 6/2005 | Hsieh | 710/313 |
| 2006/0026365 A1 | * | 2/2006 | Yamazaki | 711/137 |
| 2008/0276037 A1 | * | 11/2008 | Chang et al. | 711/103 |
| 2010/0049953 A1 | * | 2/2010 | Mylavarapu et al. | 712/225 |

FOREIGN PATENT DOCUMENTS

| | | |
|---|---|---|
| CN | 1658592 A | 8/2005 |
| CN | 1912854 A | 2/2007 |
| CN | 101339490 A | 1/2009 |

* cited by examiner

*Primary Examiner* — Reginald Bragdon
*Assistant Examiner* — Thanh D Vo
(74) *Attorney, Agent, or Firm* — Stout, Uxa, Buyan & Mullins, LLP

(57) ABSTRACT

The present invention is directed to a stream context cache system, which primarily includes a cache and a mapping table. The cache stores plural stream contexts, and the mapping table stores associated stream context addresses in a system memory. Consequently, a host may, according to the content of the mapping table, directly retrieve the stream context that is pre-fetched and stored in the cache, rather than read the stream context from the system memory.

22 Claims, 6 Drawing Sheets

STREAM CONTEXT CACHE SYSTEM

CROSS-REFERENCE TO RELATED APPLICATIONS

This application claims the benefit of U.S. Provisional Application No. 61/242,400, filed Sep. 15, 2009, the entire contents of which are hereby incorporated by reference.

BACKGROUND OF THE INVENTION

1. Field of the Invention

The present invention generally relates to universal serial bus (USB), and more particularly to a stream context cache system.

2. Description of Related Art

Universal Serial Bus (USB) is widely used in electronic devices for transferring data between a host and a peripheral device. The data transfer speed of USB 1.0 is 1.5 million bits per second (low speed) and 12 million bits per second (full speed). The data transfer speed of USB 2.0 is 480 million bits per second (high speed). USB 3.0 is released now and the data transfer speed of USB 3.0 is 4.8 billion bits per second (super speed). The detail description of USB 3.0 may be referred to "Universal Serial Bus 3.0 Specification."

In a USB system, the data transfer between the host and the device is controlled by a host controller, and the communication between the host controller and the host is specified in a host controller interface (HCI), for example, "eXtensible Host Controller Interface for Universal Serial Bus (xHCI)".

In the USB system specified by xHCI, the data structure of the transfer request block (TRB) is utilized in the data transfer. A TRB ring or a transfer ring consisted of a number of the TRBs is used for transferring data between the host and the USB device. In addition, the xHCI specifies a data structure of a data stream context, which provides a pointer for pointing to the TRB ring in the stream. In other words, the stream context must be transferred whenever the TRB is read.

Repetitive TRB readings occur in a conventional USB system. The details of the repetitive readings in the conventional USB system are discussed in an application entitled "Transfer Request Block Cache System and Method," to the same assignee of the present application, the disclosure of which is hereby incorporated by reference.

For the reason that the host controller must read the stream context from the system memory whenever the data is transferred, this will cause time delay, time waste and power consumption, and thus reduce overall system efficiency. Therefore, a need has arisen to propose a novel scheme for decreasing read time, thereby increasing the system efficiency and lowing power consumption.

SUMMARY OF THE INVENTION

In view of the foregoing that the data transfer efficiency in the conventional USB system can not be increased, it is thus an object of the embodiment of the present invention to provide a stream context cache system for advancing the access speed and lowering the power consumption.

According to one embodiment of the present invention, the stream context cache system includes a cache for storing a number of stream contexts, and a mapping table for storing a number of associated stream context addresses in a system memory. Each address in the mapping table is further associated with a valid bit for indicating whether the associated stream context is valid. A conversion table is used for converting the address of the stream context to an index value that indexes the associated stream context address stored in the mapping table. Specifically, the bits number of the index value is smaller than the bits number of the stream context address. An address check control unit is used for checking the content of the mapping table according to the index value in order to determine whether the stream context is stored in the cache. Accordingly, a host may directly retrieve one of the stream contexts that are pre-fetched and stored in the cache according to the content of the mapping table, rather than read the stream context from the system memory.

DETAILED DESCRIPTION OF THE INVENTION

Although USB 3.0 is exemplified in the following embodiment, the present invention is also adaptable to other USB standard. Moreover, a host controller interface (HCI) used in the embodiment is eXtensible Host Controller Interface for Universal Serial Bus (xHCI), but it is not limited herein. In addition, the stream context in the present invention may be a stream context specified by other HCI standards or similar data structures.

Figure 1:
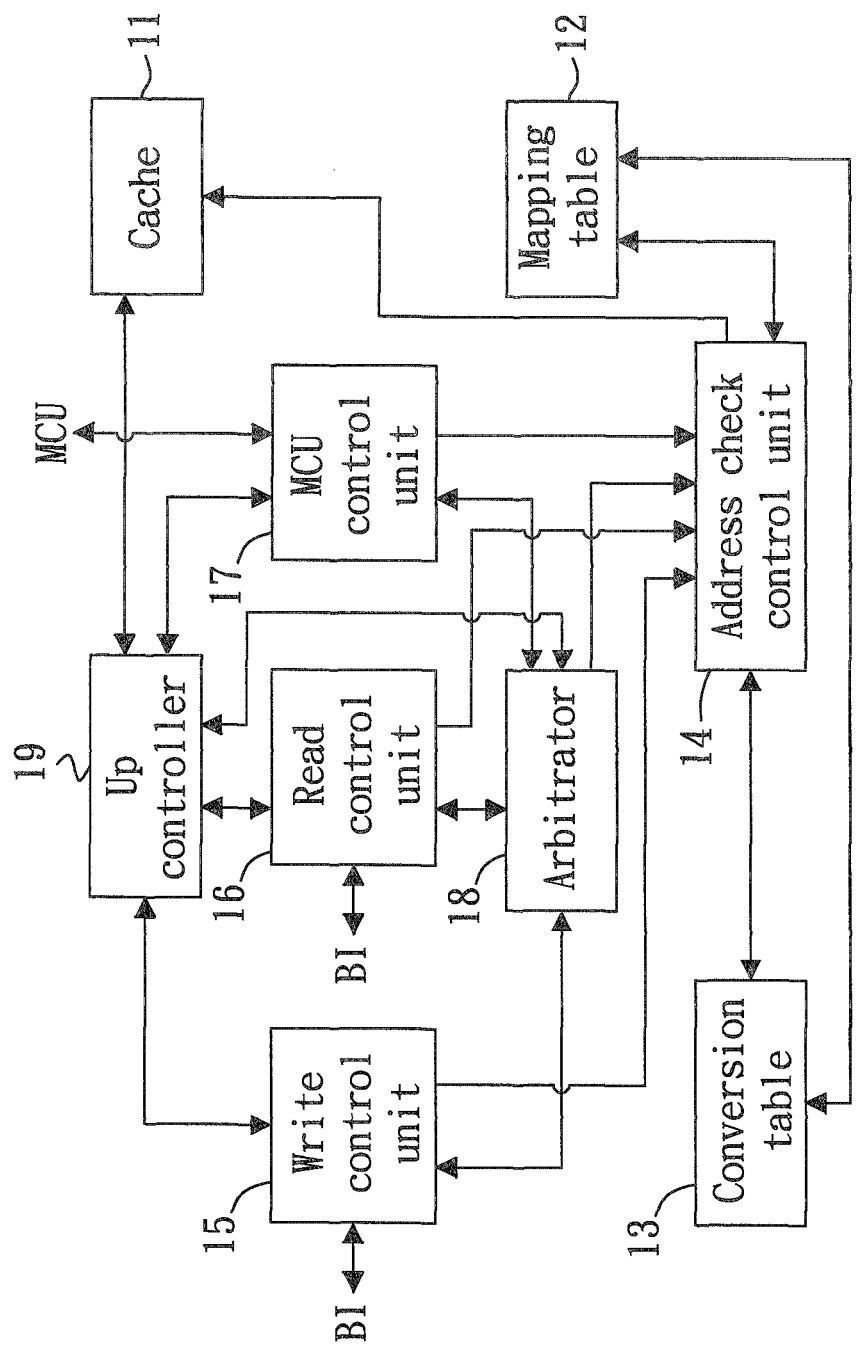
FIG. 1 shows a stream context cache system according to one embodiment of the present invention.

FIG. 1 shows a stream context cache system, which may be disposed within a host controller or in other locations, according to one embodiment of the present invention. The stream context cache system mainly includes a cache 11 (for example, static random access memory, SRAM), which is used for storing stream context that is not currently used but may be used in the future. Accordingly, when the stream context has been read and stored beforehand in the cache 11, the host need not read the stream context from the system memory but directly from the cache 11. As a result, the read speed may be substantially increased and the power consumption may be substantially decreased. In the embodiment, the size of the cache 11 is 512 bytes, and up to 32 stream contexts may be stored in the cache 11, where each stream context is 16 bytes in size.

Figure 2:
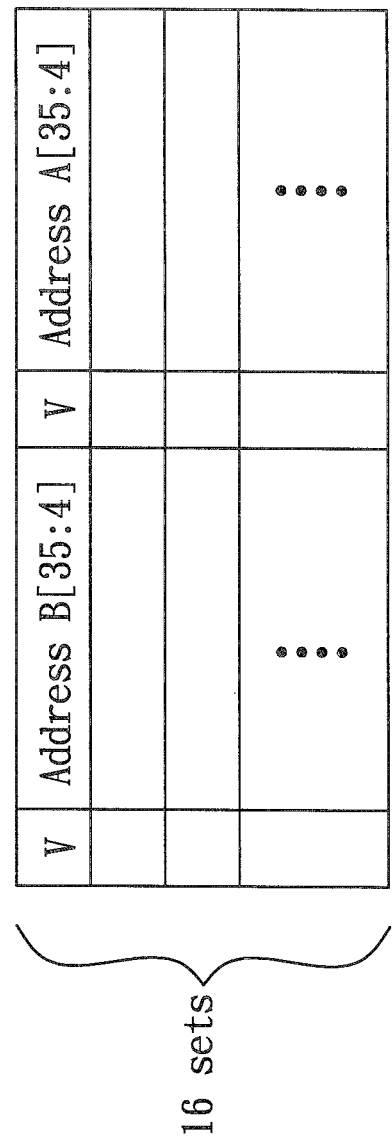
FIG. 2 shows a structure of the mapping table according to the present embodiment.

A mapping table 12 is used for storing associated addresses in the system memory of the stream contexts. FIG. 2 shows a structure of the mapping table 12 according to the embodiment, which may store 32 entries of addresses. In addition, each address is associated with a valid bit v for representing whether the stream context is valid. As each stream context is 16 bytes in the embodiment, the bit 3 and the bits below the bit 3 may be omitted, and only the address bit [35:4] is stored. In the embodiment, 2-way set association configuration is adopted in the mapping table 12, according to which the table is separated into two ways: A-way and B-way. Additionally, each way includes 16 sets.

As the bits number of the address in mapping table 12 is quite large, a large amount of time will be wasted in calculation process and location comparison. Hence, the embodiment adopts a conversion table 13 that uses an index function (for example, HASH function) for converting a long address of the stream context to a short index value. Although the HASH function is used in the conversion table for generating the index value in the embodiment, however, conversion functions other than the HASH function may be used in other embodiments as well. Because the bit [18:4] of the stream context address is the same as the bit [18:4] of the cache 11 column address, the conversion table 13 performs the HASH function on the stream context address [18:4] and then generates 5-bit HASH output, that indexes the associated address in the mapping table 12. Specifically, the HASH output bit [4:1] is used as the index values for the mapping table 12, and the HASH output bit [0] is used for selecting one of the A way and B way in the mapping table 12, that is, one entry of each set.

Furthermore, an address check control unit 14 is used for performing address comparison in order to determine whether the stream context is stored in the cache 11. It is called hit if the stream context is stored in the cache 11; otherwise, it is called miss if the stream context is not stored in the cache. In the present embodiment, the HASH output bit [0] is set to "0" to select address A when both the addresses A and B are hit or miss. The HASH output bit [0] is set to "0" when only the address A is hit. The HASH output bit [0] is set to "1" when only the address B is hit.

The stream context cache system in FIG. 1 primarily performs three operations: upstream write, upstream read and Micro Controlling Unit (MCU) related control. In xHCI, the term "upstream" indicates data flow toward the host. The three operations are respectively controlled by a stream context write control unit 15, a stream context read control unit 16 and a stream context MCU control unit 17. The MCU related control further includes: MCU pre-fetches the stream context, and MCU invalids all stream contexts and selectively invalids the stream contexts. The five operations or the control units 15/16/17 are controlled by an arbitrator 18. In addition, the present embodiment further includes an up controller 19, which is used to control data access with the system memory and data transfer with the cache 11.

Figure 3:
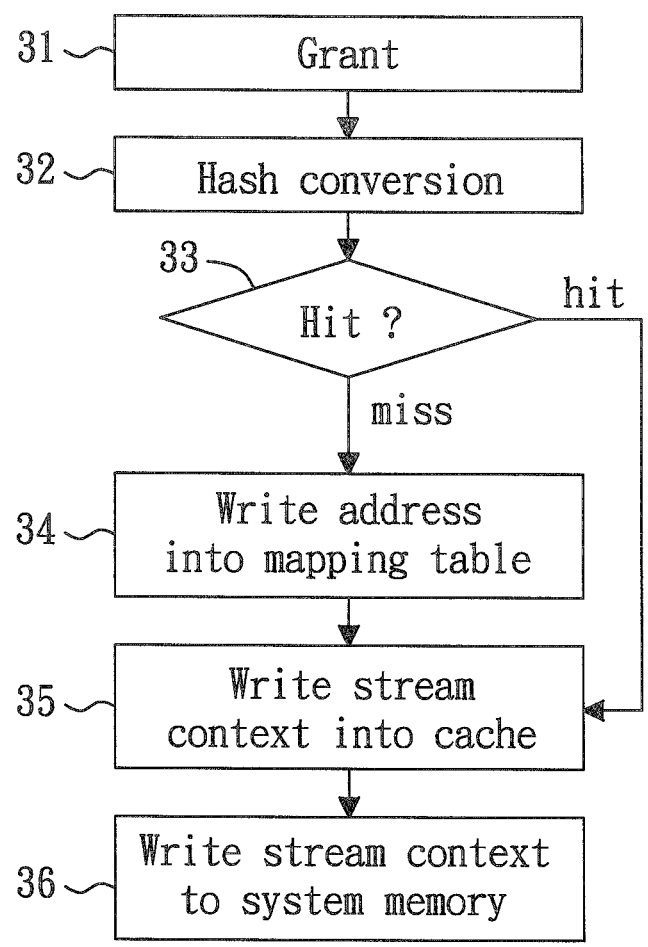
FIG. 3 shows a flow chart of performing the upstream write according to the present embodiment.

FIG. 3 shows a flow chart of performing the upstream write according to the present embodiment. When a grant is obtained (step 31), the HASH conversion is performed to obtain the associated index value (step 32). The flow proceeds to step 33 to determine whether the stream context is stored in the cache 11 according to HASH output. The address is written into the mapping table 12 (step 34), the stream context is written into the cache 11 (step 35) and the stream context is then written to the system memory from a bus instance (BI) (step 36), if the stream context is not stored (i.e., miss) in the cache 11. According to xHCI specification, the BI is the bus bandwidth associated with a data transfer speed. For example, the high speed bus instance (BI) indicated that the bandwidth is 480 million bit per second. On the other hand, the stream context is written into the cache 11 (step 35) to update the content of the cache 11 and the stream context is then written to the system memory from a BI (step 36), if the stream context is stored (i.e., hit) in the cache 11.

Figure 4:
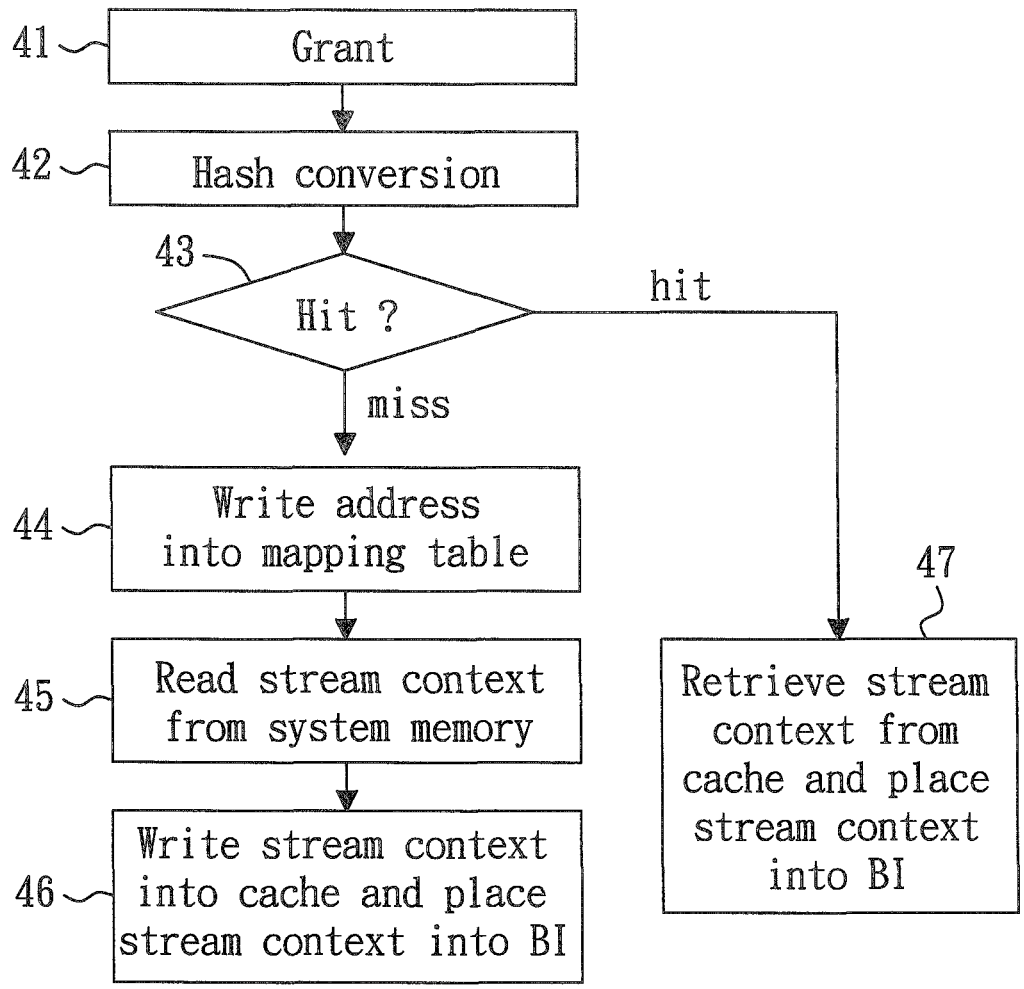
FIG. 4 shows a flow chart of performing the upstream read according to the present embodiment.

FIG. 4 shows a flow chart of performing the upstream read according to the present embodiment. When the grant is obtained (step 41), the HASH conversion is performed to obtain the associated index value (step 42). The flow proceeds to step 43 to determine whether the stream context is stored in the cache 11 according to the HASH output. If the stream context is not stored (i.e., miss) in the cache 11, the address is written into the mapping table 12 (step 44), the stream context is read from the system memory (step 45), the stream context is written into the cache 11, and the data is placed into the bus instance (BI) (step 46). On the other hand, the stream context is directly retrieved from the cache 11 and then placed into the bus instance (BI) (step 47), if the stream context is stored (i.e., hit) in the cache 11 (step 43).

Figure 5:
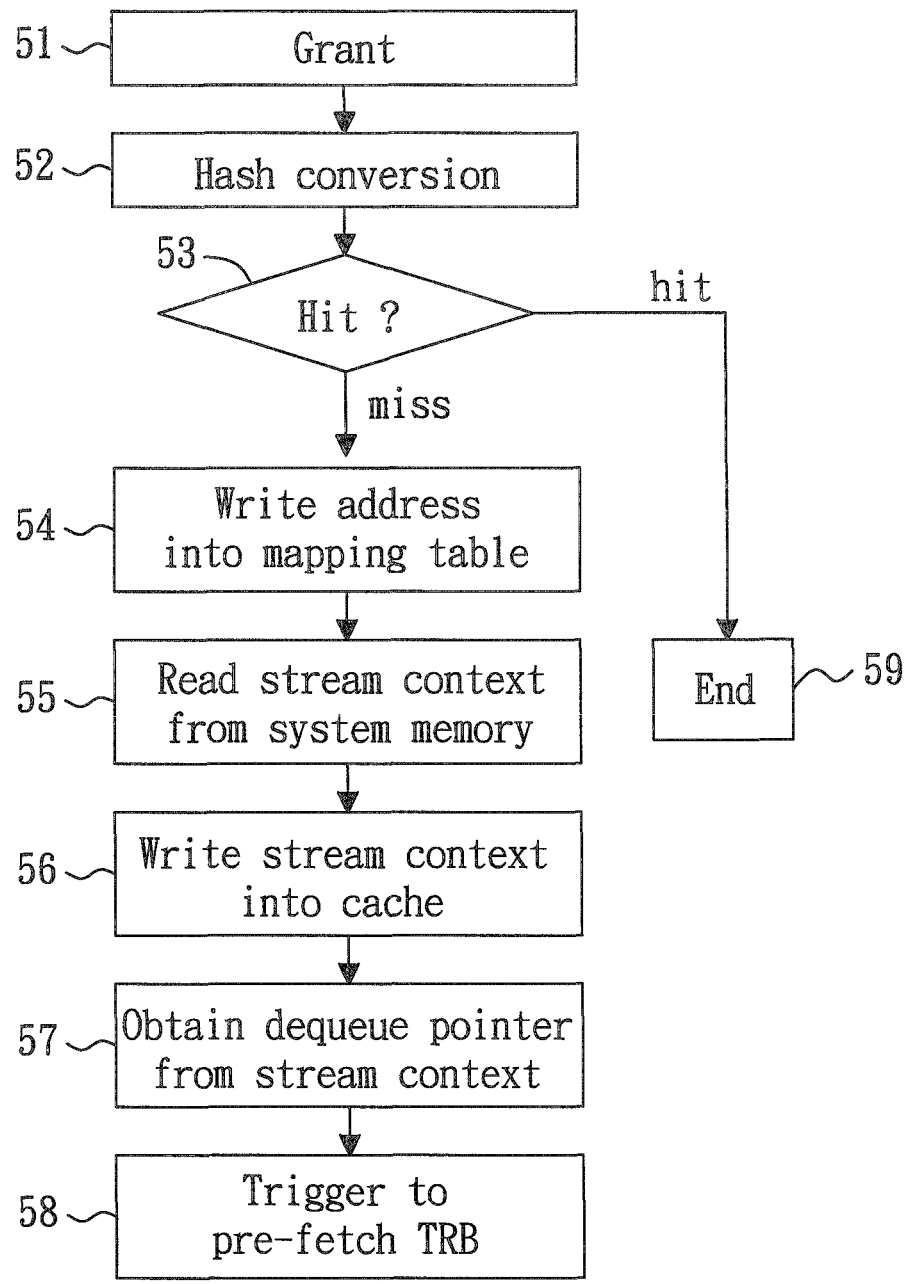
FIG. 5 is a flow chart showing that the MCU pre-fetches the stream context according to the present embodiment.

FIG. 5 is a flow chart showing that the MCU pre-fetches the stream context according to the present embodiment. When the grant is obtained (step 51), the HASH conversion is performed to obtain the associated index value (step 52). The flow proceeds to step 53 to determine whether the stream context is stored in the cache 11 according to the HASH output. The address is written into the mapping table 12 (step 54), the stream context is read from the system memory (step 55) and the stream context is then written into the cache 11 (step 56), if the stream context is not stored (i.e., miss) in the cache 11. A dequeue pointer is obtained from the pre-fetched stream context (step 57), and TRB pre-fetching is triggered (step 58). The details of pre-fetching the TRB is discussed in an application entitled "Transfer Request Block Cache System and Method," to the assignee of the present application, the disclosure of which is hereby incorporated by reference. According to the xHCI specification, the dequeue pointer points to the TRB to be processed by the host controller. The flow ends (step 59) if the stream context is stored (i.e., hit) in the cache 11 determined in step 43.

Figure 6:
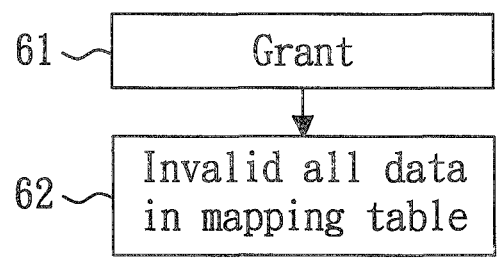
FIG. 6 is a flow chart showing that the MCU invalids all the stream contexts according to the present embodiment.

FIG. 6 is a flow chart showing that the MCU invalids all the stream contexts according to the present embodiment. When the grant is obtained (step 61), all data in the mapping table 12 are invalid. In other words, all valid bits are set to "0" (step 62).

Figure 7:
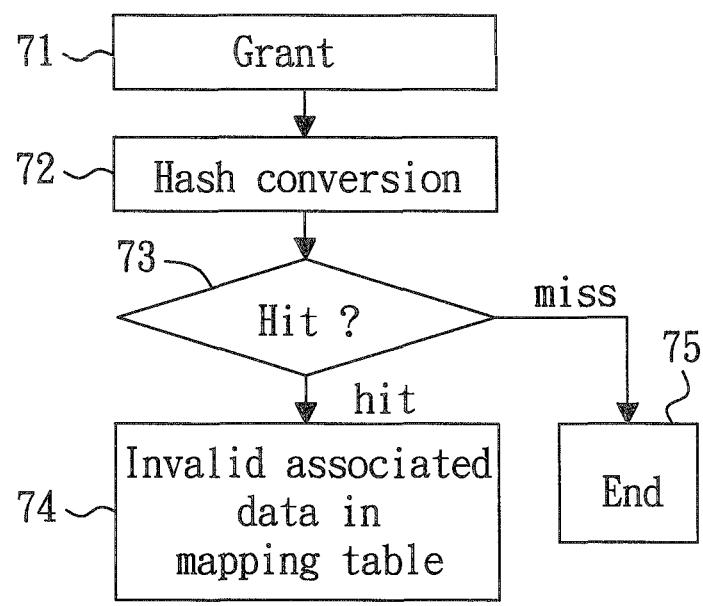
FIG. 7 is a flow chart showing that the MCU selectively invalids the stream contexts according to the present embodiment.

FIG. 7 is a flow chart showing that the MCU selectively invalids the stream contexts according to the present embodiment. When the grant is obtained (step 71), the HASH conversion is preformed (step 72) to obtain the associated index value. The flow proceeds to step 73 to determine whether the stream context is stored in the cache 11 according to the HASH output. The associated data in the mapping table 12 are invalid by setting the associated valid bits to "0", when the stream context is stored (i.e., hit) in the cache 11 (step 74). The flow ends (step 75) if the stream context is not stored (i.e., miss) in the cache 11.

Although specific embodiments have been illustrated and described, it will be appreciated by those skilled in the art that various modifications may be made without departing from the scope of the present invention, which is intended to be limited solely by the appended claims.

What is claimed is:

1. A stream context cache system in a host controller that controls data transfer between a host and a peripheral device, comprising:
   a cache configured to store a plurality of stream contexts that are read from a system memory of the host, the stream contexts being provided to point to transfer request blocks (TRBs)
   a mapping table configured to store a plurality of associated stream context addresses, wherein the associated stream context addresses are corresponding addresses of the plurality of stream contexts stored in the cache, and the associated stream context addresses are addresses in the system memory; and
   a stream context read control unit configured to determine whether one of the stream contexts is stored in the cache according to the mapping table;

wherein if one of the stream contexts is stored in the cache, the stream context read control unit directly retrieves the one stream context from the cache rather than reading the stream context from the system memory, and places the one stream context to a bus instance (BI).

2. The system of claim 1, wherein the cache comprises a Static Random Access Memory (SRAM).

3. The system of claim 1, wherein each of the addresses further comprises an associated valid bit in the mapping table for indicating whether the associated stream context is valid.

4. The system of claim 1, wherein the mapping table uses 2-way set association structure which has two ways, and each said way includes a plurality of sets.

5. The system of claim 1, further comprising:
a conversion table for converting a stream context address to an index value that indexes the associated stream context addresses stored in the mapping table.

6. The system of claim 5, wherein the conversion table uses an index function for converting the stream context address to the index value, wherein bits number of the index value is smaller than bits number of the stream context address.

7. The system of claim 6, wherein the index function is HASH function.

8. The system of claim 5, further comprising:
an address check control unit configured to check the content of the mapping table according to the index value in order to determine whether the stream context is stored in the cache.

9. The system of claim 1, at least one of following operations is performed: upstream write, upstream read and Micro Control Unit (MCU) related control.

10. The system of claim 9, wherein the MCU related control comprises at least one of following operations:
the MCU pre-fetches the stream context;
the MCU invalids all stream contexts; and
the MCU selectively invalids the stream contexts.

11. The system of claim 10, further comprising:
a stream context write control unit configured to control the upstream write;
the stream context read control unit configured to control the upstream read; and
a stream context MCU control unit configured to control the MCU related control.

12. The system of claim 11, further comprising:
an arbitrator configured to control the stream context write control unit, the stream context read control unit and the stream context MCU control unit.

13. The system of claim 11, wherein the MCU control unit performs the operation of the MCU invaliding all stream contexts according to following step:
invaliding all data in the mapping table.

14. The system of claim 11, wherein the MCU control unit performs the operation of the MCU selectively invaliding the stream contexts according to following steps:
determining whether the stream context is stored in the cache;
invaliding the associated data in the mapping table if the stream context is stored in the cache; and
ending the operation if the stream context is not stored in the cache.

15. The system of claim 1, further comprising:
an up controller configured to control data access with the system memory, and data transfer with the cache.

16. The system of claim 1, wherein the stream context read control unit writes one of the associated stream context addresses corresponding to the one stream context into the mapping table, reads the one stream context from the system memory, writes the one stream context into the cache and places the stream context to the bus instance (BI), if the stream context is not stored in the cache.

17. The system of claim 1, wherein, if one of the associated stream context addresses corresponding to the one of the stream contexts is stored in the mapping table, the stream context read control unit determines that the one of the stream contexts is stored in the cache.

18. A stream context cache system in a host controller that controls data transfer between a host and a peripheral device, comprising:
a cache configured to store a plurality of stream contexts that are read from a system memory of the host, the stream contexts being provided to point to transfer request blocks (TRBs);
a mapping table configured to store a plurality of associated stream context addresses, wherein the associated stream context addresses are corresponding addresses of the plurality of stream contexts stored in the cache, and the associated stream context addresses are addresses in the system memory; and
a stream context MCU control unit configured to determine whether one of the stream contexts is stored in the cache according to the mapping table;
wherein if the one stream context is not stored in the cache, the stream context MCU control unit writes one of the associated stream context addresses corresponding to the one stream context into the mapping table, reads one of the stream contexts from the system memory, writes the one stream context into the cache and obtains a dequeue pointer from the stream context for triggering pre-fetching TRB.

19. The system of claim 18, wherein, if one of the associated stream context addresses corresponding to the one of the stream contexts is stored in the mapping table, the stream context MCU control unit determines that the one of the stream contexts is stored in the cache.

20. A stream context cache system in a host controller that controls data transfer between a host and a peripheral device, comprising:
a cache configured to store a plurality of stream contexts that are read from a system memory of the host, the stream contexts being provided to point to transfer request blocks (TRBs);
a mapping table configured to store a plurality of associated stream context addresses, wherein the associated stream context addresses are corresponding addresses of the plurality of stream contexts stored in the cache, and the associated stream context addresses are addresses in the system memory; and
a stream context write control unit configured to determine whether one of the stream contexts is stored in the cache according to the mapping table;
wherein if the one of the stream contexts is stored in the cache, the stream context write control unit writes the one of the stream contexts into the cache for updating the content of the cache, and writes the one of the stream contexts to the system memory from a bus instance.

21. The system of claim 20, wherein the stream context write control unit
writes one of the associated stream context addresses corresponding to the one stream context into the mapping table, writes the one stream context into the cache and writes the one stream context to the system memory from the bus instance (BI), if the one stream context is not stored in the cache.

22. The system of claim 20, wherein, if one of the associated stream context addresses corresponding to the one of the stream contexts is stored in the mapping table, the stream context write control unit determines that the one of the stream contexts is stored in the cache.

\* \* \* \* \*